(12) United States Patent
Otxoa-Aizpurua Calvo

(10) Patent No.: US 11,613,390 B2
(45) Date of Patent: Mar. 28, 2023

(54) PACKAGING MACHINE FOR GENERATING RE-CLOSABLE PACKAGES

(71) Applicant: ULMA Packaging, S. Coop., Oñati (ES)

(72) Inventor: Alberto Otxoa-Aizpurua Calvo, Oñati (ES)

(73) Assignee: ULMA PACKAGING, S. COOP., Oñati (ES)

( * ) Notice: Subject to any disclaimer, the term of this patent is extended or adjusted under 35 U.S.C. 154(b) by 253 days.

(21) Appl. No.: 17/075,932

(22) Filed: Oct. 21, 2020

(65) Prior Publication Data

US 2021/0155354 A1 May 27, 2021

(30) Foreign Application Priority Data

Nov. 25, 2019 (EP) ..................................... 19383039

(51) Int. Cl.
*B65B 9/067* (2012.01)
*B29C 65/00* (2006.01)
*B29C 65/74* (2006.01)
*B29L 31/00* (2006.01)

(52) U.S. Cl.
CPC ............ *B65B 9/067* (2013.01); *B29C 65/741* (2013.01); *B29C 66/0326* (2013.01);
(Continued)

(58) Field of Classification Search
CPC ... B65B 9/067; B29C 65/741; B29C 66/0326; B29C 66/849
(Continued)

(56) References Cited

U.S. PATENT DOCUMENTS 4,546,596 A * 10/1985 Cherney ................. B29C 65/02
53/551
4,894,975 A * 1/1990 Ausnit ................ B29C 66/7392
53/139.2
(Continued)

FOREIGN PATENT DOCUMENTS

| AU | 2018100979 A4 | 8/2018 |
|---|---|---|
| DE | 69502121 T2 | 12/1998 |
| ES | 1217722 U | 9/2018 |

OTHER PUBLICATIONS

Extended European Search Report received in application No. 19383039.5 dated Jun. 18, 2020 (6 pages).

*Primary Examiner* — Robert F Long
*Assistant Examiner* — Xavier A Madison
(74) *Attorney, Agent, or Firm* — Edell, Shapiro & Finnan, LLC

(57) ABSTRACT

Disclosed is a machine for generating re-closable packages. According to one embodiment the machine includes a forming tube configured to impart a tubular shape to a continuous film, a driving module that moves the film tube in a forward movement direction at a first forward movement speed, a longitudinal sealing tool for sealing the longitudinal ends of the film with a tubular shape, a film tube being generated. The machine includes a first driving assembly for moving the film tube in the forward movement direction at a second forward movement speed, and a transverse sealing and cutting tool for transversely sealing and cutting the film tube, a package being obtained as a result. The machine also includes a second driving assembly located upstream the longitudinal sealing tool and configured for moving the re-closable strip at a third forward movement speed, the first, second and third forward movement speeds being equal.

18 Claims, 8 Drawing Sheets

(52) U.S. Cl.
CPC ........ *B29C 66/4329* (2013.01); *B29C 66/849* (2013.01); *B29L 2031/712* (2013.01)

(58) Field of Classification Search
USPC .......................................................... 53/545
See application file for complete search history.

(56) References Cited

U.S. PATENT DOCUMENTS

| | | | | |
|---|---|---|---|---|
| 5,127,208 | A * | 7/1992 | Custer | B29C 66/346 |
| | | | | 493/212 |
| 5,417,035 | A * | 5/1995 | English | B65B 61/188 |
| | | | | 53/551 |
| 5,768,852 | A | 6/1998 | Terminella | |
| 5,930,983 | A | 8/1999 | Terminella | |
| 6,029,428 | A * | 2/2000 | Terminella | B29C 66/81422 |
| | | | | 53/139.2 |
| 6,553,744 | B1 * | 4/2003 | Terminella | B65B 65/06 |
| | | | | 53/551 |
| 6,675,558 | B2 * | 1/2004 | Kinigakis | B29C 66/1122 |
| | | | | 53/412 |
| 6,769,229 | B2 * | 8/2004 | Kinigakis | B65B 43/30 |
| | | | | 53/133.4 |
| 7,305,805 | B2 * | 12/2007 | Dierl | B65B 9/20 |
| | | | | 53/551 |
| 7,748,200 | B2 * | 7/2010 | Buchman | B65B 61/02 |
| | | | | 53/139.2 |
| 8,522,516 | B2 * | 9/2013 | Ichikawa | B65B 9/20 |
| | | | | 493/308 |
| 2016/0122061 | A1 * | 5/2016 | Radzanowski | B65B 59/02 |
| | | | | 493/193 |

\* cited by examiner

PACKAGING MACHINE FOR GENERATING RE-CLOSABLE PACKAGES

CROSS-REFERENCE TO RELATED APPLICATIONS

This application relates to and claims the benefit and priority to European Application No. EP19383039.5, filed Nov. 25, 2019.

TECHNICAL FIELD

The present invention relates to packaging machines for generating re-closable packages, particularly to vertical or inclined packaging machines.

BACKGROUND

There are known packaging machines comprising a film feeding device for supplying a continuous film to a forming tube which is adapted for imparting a tubular shape to the film supplied by the feeding device and comprising a longitudinal axis in a forward movement direction, a longitudinal sealing tool which is adapted for longitudinally sealing longitudinal ends of the film with a tubular shape and generating a film tube, sealing to one another overlapping areas of said longitudinal ends along a segment of the film with a tubular shape, a driving module which is arranged facing the forming tube and adapted for moving the film tube in the forward movement direction by driving, and a transverse sealing and cutting tool adapted for transversely sealing and cutting the film tube below the forming tube.

Longitudinal sealing can be performed with different technologies, such as by heating or by ultrasound (with or without direct contact with the film, respectively). Furthermore, for generating certain types of packages commonly referred to as doy packs and pouches, longitudinal sealing tools comprising two sealing elements are known, between which there are arranged the overlapping areas of the film with a tubular shape for sealing to one another the longitudinal ends of said areas along a segment of the film with a tubular shape. Document U.S. Pat. No. 5,768,852A, for example, discloses intermittent action of the longitudinal sealing tool, whereas in US2016122061A1, for example, the action is continuous.

Packaging machines are furthermore adapted for generating re-closable packages. These packages require a re-closable strip (Velcro or zipper-type, for example), for easy opening and closure. U.S. Pat. No. 5,768,852A and US2016122061A1 disclose these machines. These machines comprise a zipper feeding device, a plurality of positioning devices (idle rollers in this case) receiving said zipper and redirecting it to be supplied in the forward movement direction in which the film tube moves forward. The positioning devices are arranged such that they furthermore cause the zipper to be arranged between the longitudinal ends of the film with a tubular shape enveloping the forming tube, and overlapping one another, said zipper being sandwiched between both longitudinal ends. Thus, when the longitudinal sealing which seals said two overlapping ends to one another is performed, the zipper is also sealed to the film (to the film tube).

ES1217722U discloses a packaging machine which is adapted in certain embodiments for generating re-closable packages. In these embodiments, the machine comprises a securing roller below the longitudinal sealing tool and another securing roller above said longitudinal sealing tool, and both securing rollers are configured for pressing and moving the overlapping longitudinal ends of the film tube, such that during the longitudinal sealing process, when the longitudinal sealing tool of the film is separated (when there is a shortage of product to be packaged, for example, the forward movement of film is halted and the longitudinal sealing tool is separated state of the art so as not to burn the film in the case of using longitudinal sealing tools with said technology), the surface of the film to be sealed is prevented from being secured by the securing rollers such that the correct arrangement of the overlapping areas of the longitudinal ends of said film once the packaging process resumes is assured.

SUMMARY

Provided is a packaging machine for generating re-closable packages.

The packaging machine comprises:
  a forming tube configured for receiving a continuous film and for imparting a tubular shape to said film, the forming tube comprising a first area and a second area and the first area being configured for receiving the continuous film and for imparting a tubular shape to said film, such that said film surrounds the second area and longitudinal ends of said film are located facing one another around said second area,
  a longitudinal sealing tool which is adapted for longitudinally sealing to one another longitudinal ends of the film with a tubular shape, a film tube being generated,
  a driving module which is arranged facing the second area of the forming tube and adapted for moving the film tube in a forward movement direction at a specific first forward movement speed,
  a first driving assembly which is arranged facing the forming tube and arranged downstream of the longitudinal sealing tool in the forward movement direction and configured for moving the film tube in the forward movement direction at a specific second forward movement speed, acting on the longitudinal ends previously sealed to one another, and
  a transverse sealing and cutting tool arranged downstream of the forming tube in the forward movement direction and adapted for transversely sealing and cutting the film tube, a package being obtained as a result.

The machine further comprises a feeding device for supplying a continuous re-closable strip and a guiding device which is arranged upstream of the second area of the forming tube in the forward movement direction and configured for receiving the continuous re-closable strip and redirecting it in said forward movement direction, such that the re-closable strip is housed between the longitudinal ends of the film in the second area of the forming tube, with the longitudinal ends arranged facing one another on each side of the re-closable strip. The longitudinal sealing tool is thus adapted for sealing said longitudinal ends and the re-closable strip to one another, and the first driving assembly is thus adapted for moving the film tube and the re-closable strip in the forward movement direction.

The machine further comprises:
  a second driving assembly upstream of the longitudinal sealing tool in the path of the re-closable strip and configured for moving the re-closable strip at a specific third forward movement speed towards the longitudinal sealing tool,
  actuation means adapted for causing the actuation of the driving module and of the two driving assemblies, and a control device configured for acting on the actuation means for said actuation means to cause the first forward movement speed, the second forward movement speed, and the third forward movement speed to be substantially the same.

In ES1217722U, an upper securing roller facing the second area of the forming tube, upstream of the sealing tool, moves both the re-closable strip housed between the longitudinal ends of the film and said film, in a joint manner, and since at that point the re-closable strip and the longitudinal ends of the film are separated from one another (not attached to one another given that the sealing tool is arranged downstream), there is a risk that due to the different properties of both materials (re-closable strip and film) and/or due to different circumstances (such as, for example, applying tension to the re-closable strip and/or of film), there may be slippage between both materials that would give rise to creases and/or flaws in the final package.

This could also occur, for example, if any additional action is performed on the re-closable strip between the re-closable strip feeding device and the second driving assembly (such as for example intermittent forward movements for generating marks or holes in the re-closable strip, etc.), and/or any additional action on the film before said film reaches the forming tube (such as for example intermittent forward movements for printing on the film, labeling, generating marks or holes in the film, etc.). As a result of said actions (or as a result of only one of them), tensions and/or deformations can be generated in the re-closable strip and/or in the film in the direction opposite the forward movement of said re-closable strip or film, and said tensions in the re-closable strip and in the film can be different, which could give rise to slippage between said re-closable strip and said film.

In the proposed machine, there is no element that has to move two separate materials (re-closable strip and film separately, without a seal between them). The second driving assembly causes movement of only the re-closable strip, therefore there will be no slippage whatsoever between two different materials; the driving module only contacts with the film tube and the first driving assembly moves the re-closable strip already sealed to the film tube, so although said first driving assembly moves both the film and the re-closable strip, they are already attached to one another and no slippage between them whatsoever may be generated either.

By acting on the actuation means of the driving module and of the two driving assemblies for said actuation means to cause all the described forward movement speeds to be substantially the same (the first forward movement speed of the film tube by means of the driving module acting only on the film, the third forward movement speed of the re-closable strip by means of the second driving assembly acting only on the re-closable strip, and the second forward movement speed of the assembly formed by the re-closable strip sealed to the film tube by means of the first driving assembly preferably acting on the longitudinal ends of the film tube between which the re-closable strip is housed), the proposed machine furthermore allows arranging the re-closable strip and the film in the desired position, regardless, furthermore, of the additional possible actions on the previously described re-closable strip and/or film. The re-closable strip can thereby be positioned with respect to the film in a precise manner both in the forward movement direction and with respect to the longitudinal ends of the film tube, and a substantially equal forward movement of the re-closable strip, of the film, and of the film tube with the re-closable strip sealed to the longitudinal ends of the film is furthermore assured, whereby assuring that all these elements are arranged with respect to other as required so that deficiencies, such as creases in the final package, for example, do not arise. This also means that both the film and the re-closable strip move forward in unison.

These and other advantages and features will become apparent in view of the drawings and the detailed description.

DETAILED DESCRIPTION

Figure 1:
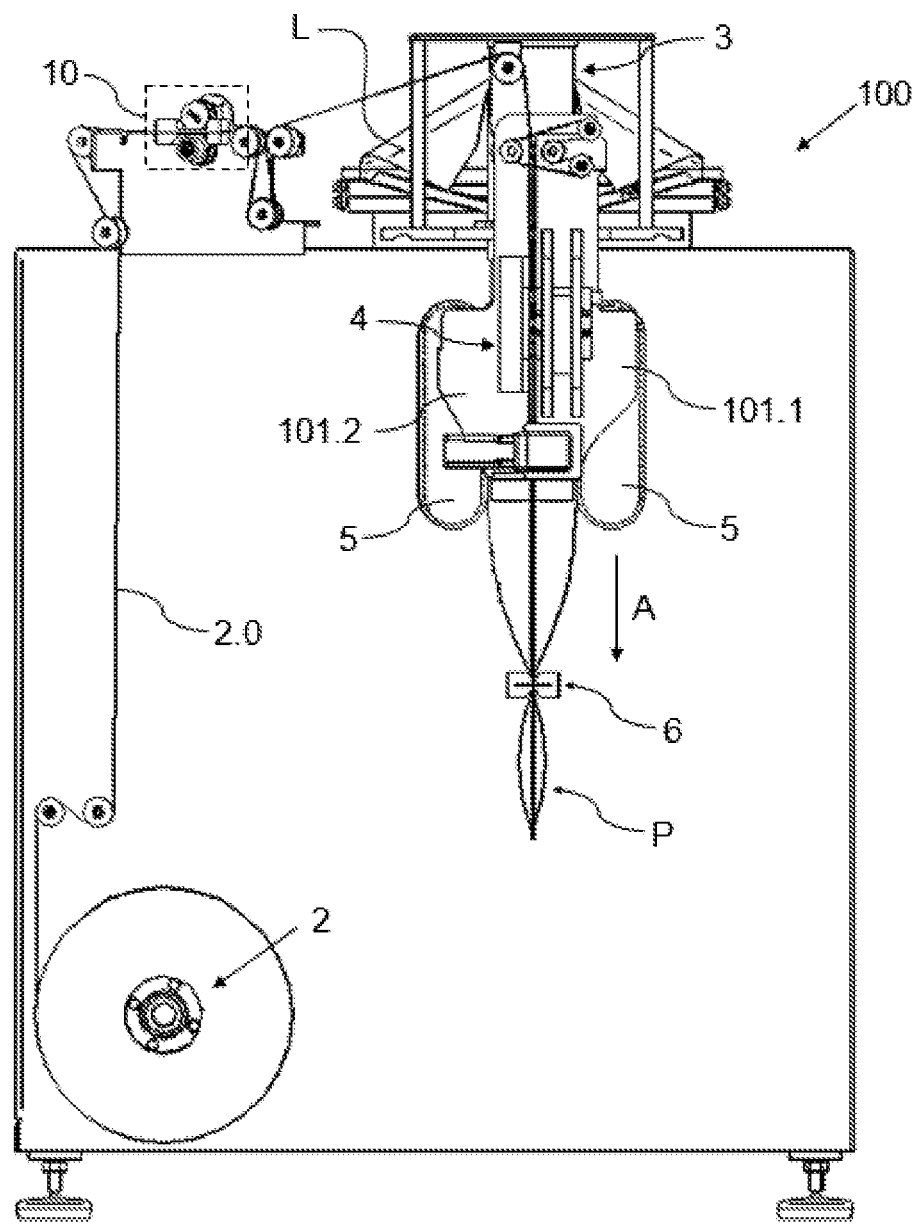
FIG. 1 schematically shows a packaging machine according to one embodiment.

FIG. 1 shows a preferred embodiment of the packaging machine 100 of the invention, a machine 100 in this case that could also be inclined, for example, which is adapted for generating re-closable packages from a continuous film L and a continuous re-closable strip 2.0.

Re-closable packages must be interpreted to mean those packages which can be closed again once they have been opened, and for that purpose comprise a re-closable strip (a zipper or Velcro, for example). These strips are formed by two elements which are attached to and separated from one another to open the package, being reattached to close it. Preferably, the machine 100 can generate re-closable packages of different types, such as those commonly known in the sector as doy packs and pouches.

The machine 100 comprises a film feeding device, not depicted in the drawings, which supplies a continuous film L and a forming tube 3 which is adapted for receiving the film L supplied by the film feeding device and for imparting a tubular shape, and comprising a longitudinal axis 3.0. The film feeding device comprises a shaft on which the film L is arranged wound in the form of a reel, and the rotation of the reel on said shaft unwinds the film L, the continuous film L thus being supplied.

Figure 2:
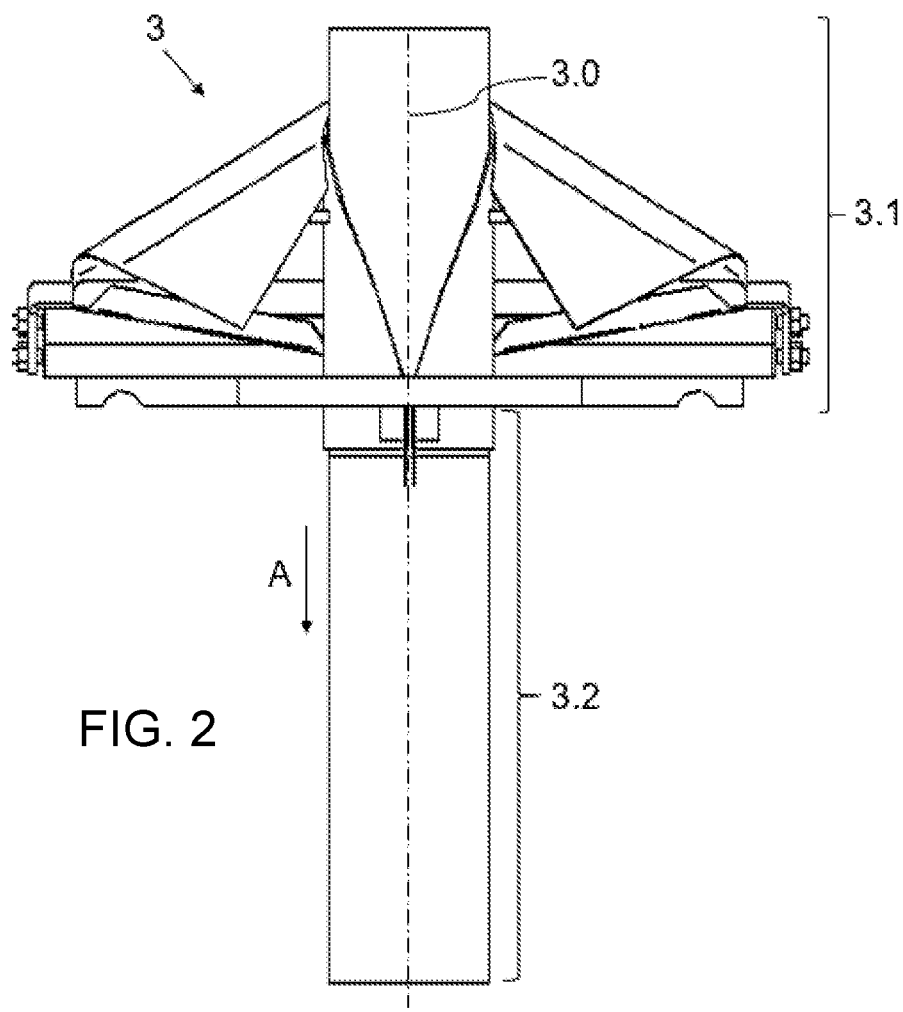
FIG. 2 shows a forming tube of the machine of FIG. 1.
Figure 3:
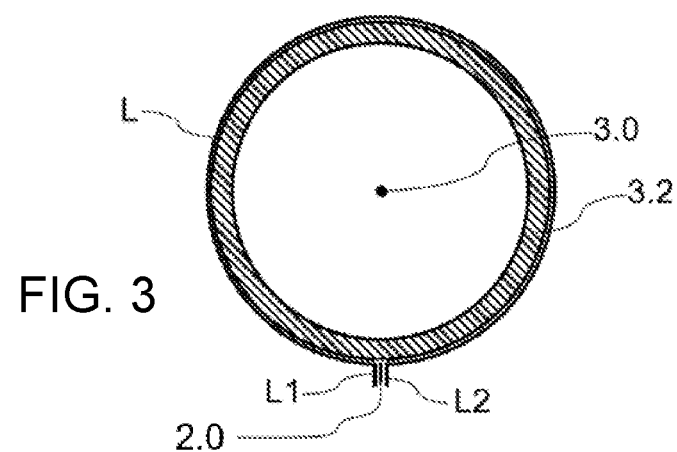
FIG. 3 shows a section and plan view of a second area of the forming tube of FIG. 2, with a tubular-shaped film surrounding said second area and a re-closable strip.

The forming tube 3 comprises a first area 3.1 and a second area 3.2 downstream of said first area 3.1 in a forward movement direction A, which is parallel to the longitudinal axis 3.0 of the forming tube 3, as shown in FIG. 2. The first area 3.1 is configured for receiving the continuous film L, and for imparting a tubular shape to said film L such that said film L surrounds the second area 3.2 and the longitudinal ends L1 and L2 of said film L are located facing one another around said second area 3.2, as shown by way of example in FIG. 3. Said FIG. 3 shows a section and plan view of a simplified forming tube 3, but the forming tube 3 may comprise other shapes in addition to a cylindrical shape, depending on the desired final package, such that the tubular shape acquired by the film will also have the same geometry as forming tube 3.

The machine 100 further comprises a longitudinal sealing tool 4 which is adapted for longitudinally sealing the film L with a tubular shape, sealing the longitudinal ends L1 and L2, a film tube being generated. Preferably, the longitudinal sealing tool 4 remains stationary in the forward movement direction A with the machine 100 in operation and comprises two facing sealing elements 4.1 cooperating with one another to perform the corresponding sealing. The sealing elements 4.1 are configured for sealing the longitudinal ends L1 and L2 preferably by heat and proximity, without pressing said longitudinal ends L1 and L2 against one another. In the preferred embodiment, the sealing elements 4.1 can move in opposite directions, moving closer to one another to perform sealing in a sealing position in which the heat generated by said sealing elements 4.1 causes sealing (see FIG. 4C) and moving apart from one another in an inoperative position in which the heat generated by said sealing elements 4.1 does not affect the longitudinal ends L1 and L2, and, therefore, does not seal them (see FIG. 4A). Said sealing elements 4.1 are actuated by means of an actuation device, which may be pneumatic, for example, preferably to move them simultaneously and synchronously. In other alternative embodiments, the sealing elements 4.1 are preferably configured for sealing the longitudinal ends L1 and L2 by heat, pressing said longitudinal ends L1 and L2 against one another such that said longitudinal ends L1 and L2 are sealed to one another due to the effect of heat and pressure. In these embodiments, the sealing elements 4.1 move in opposite directions, moving closer to one another to perform sealing in a sealing position and moving apart from one another to an inoperative position to allow the forward movement of the longitudinal ends L1 and L2 through them in the forward movement direction A.

The machine 100 further comprises a driving module 5 which is arranged facing the second area 3.2 of the forming tube 3, arranged in an angular position with respect to the longitudinal axis 3.0 of the forming tube 3 different from the angular position with respect to said longitudinal axis 3.0 in which the longitudinal sealing tool 4 is arranged, and adapted for moving the film tube in the forward movement direction A and at a specific first forward movement speed.

Figure 4A:
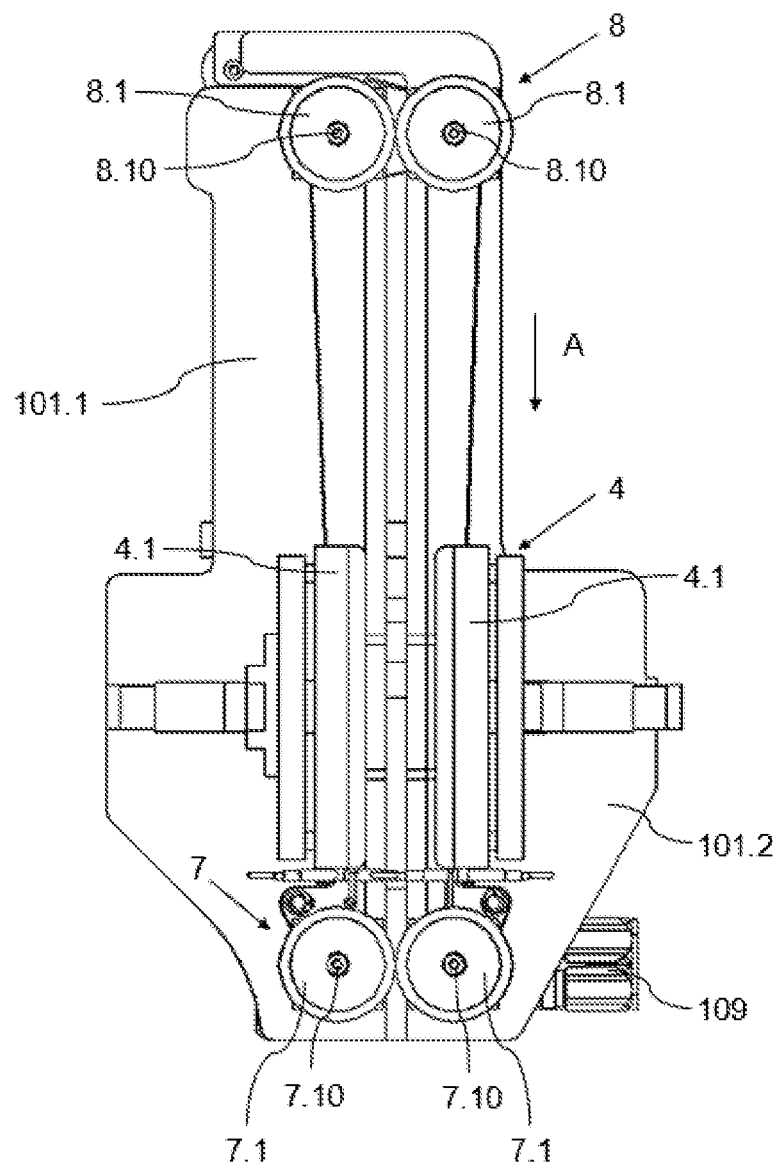
FIG. 4A shows a front view of driving assemblies of the machine of FIG. 1 in an operative position, with sealing elements of a longitudinal sealing tool of said machine in an inoperative position.
Figure 4B:
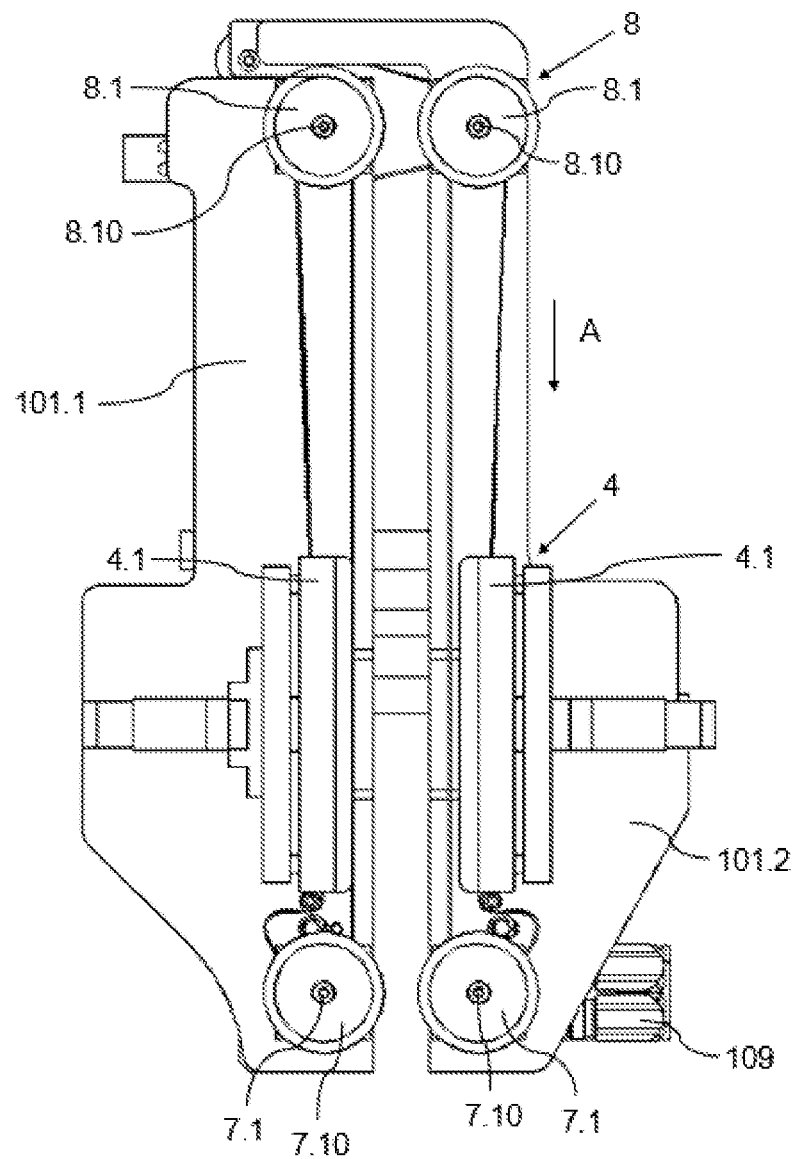
FIG. 4B shows a front view of the driving assemblies of the machine of FIG. 1, in a switching position.
Figure 4C:
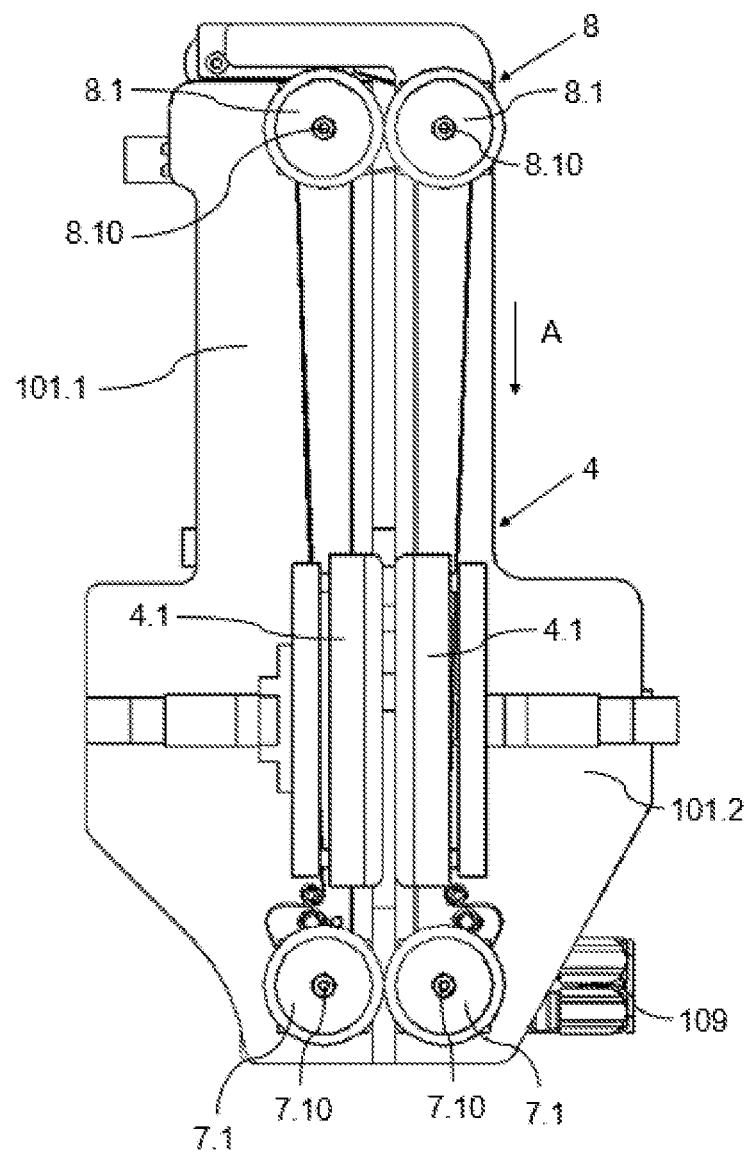
FIG. 4C shows a front view of the driving assemblies of the machine of FIG. 1 in the operative position, with the sealing elements of the longitudinal sealing tool of said machine in a sealing position.

The machine 100 also comprises a first driving assembly 7 which is arranged facing the forming tube 3 and arranged downstream of the longitudinal sealing tool 4 in the forward movement direction A, which is configured for moving the film tube in the forward movement direction A at a specific second forward movement speed, acting on the longitudinal ends L1 and L2 previously sealed to one another, and shown in greater detail in FIGS. 4A, 4B, and 4C.

Preferably, the driving module 5 can comprise a belt which presses the film tube (and/or the film with a tubular shape) against the forming tube 3, or it can comprise suction means causing suction on the film tube, pressing said film tube against the belt of said driving module 5. The driving module 5 causes the movement of said belt, in turn causing with said movement the movement of the film tube in the forward movement direction A. The machine 100 can comprise one or more driving modules 5 arranged in an angular position with respect to the longitudinal axis 3.0 of the forming tube 3 different from the angular position with respect to said longitudinal axis 3.0 in which the longitudinal sealing tool 4 is arranged.

Figure 5:
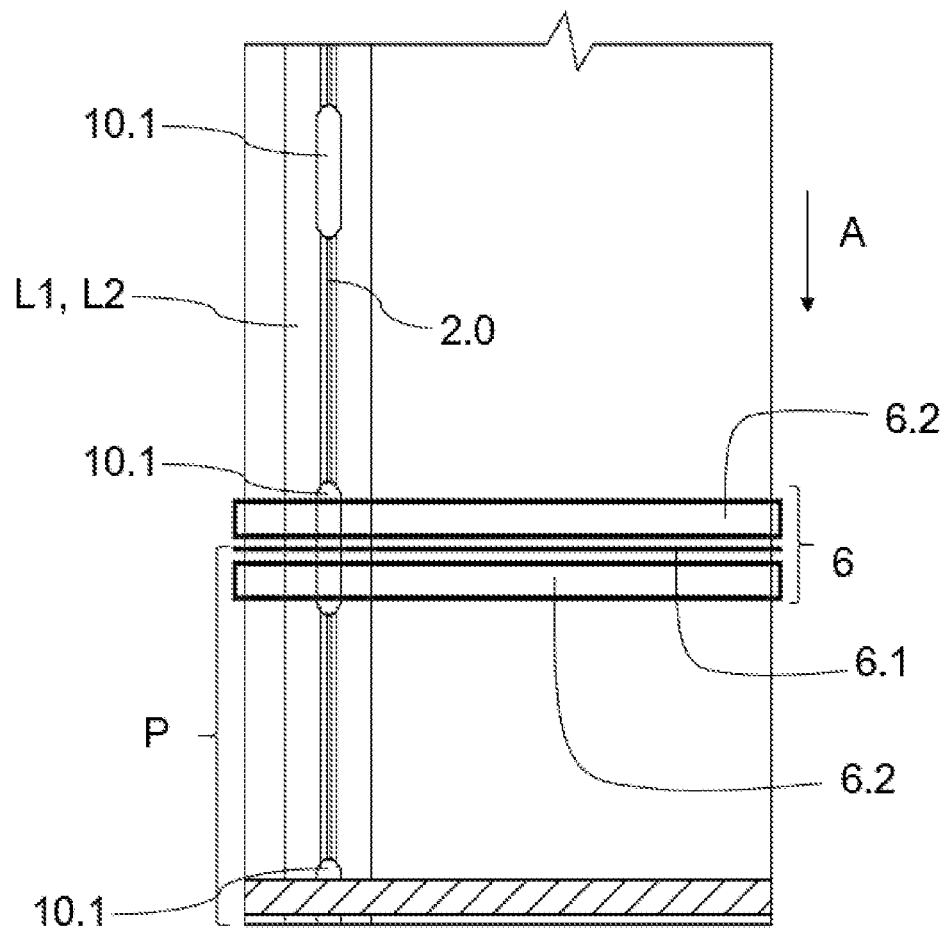
FIG. 5 shows a simplified view of the actuation of a transverse sealing and cutting tool of the machine of FIG. 1 on a film tube.

The machine 100 further comprises a transverse sealing and cutting tool 6 which is arranged downstream of the forming tube 3 in the forward movement direction A and adapted for transversely sealing and cutting the film tube, a package P being obtained as a result. Preferably, the transverse sealing and cutting tool 6 comprises a cutting blade 6.1 and a sealing element 6.2 on each side of the cutting blade 6.1 in the forward movement direction A, as depicted in FIG. 5.

The machine 100 further comprises a re-closable strip feeding device 2 for supplying a continuous re-closable strip 2.0 and thus being able to generate re-closable packages P. The re-closable strip feeding device 2 comprises a shaft on which the re-closable strip 2.0 is arranged wound in the form of a reel, and the rotation of the reel on said shaft unwinds the re-closable strip 2.0, said continuous re-closable strip 2.0 thus being supplied.

The re-closable strip 2.0 is arranged between the longitudinal ends L1 and L2 of the film with a tubular shape, such that when the longitudinal sealing tool 4 performs the corresponding sealing, the re-closable strip 2.0 is sealed to said longitudinal ends L1 and L2. To carry out this arrangement, a guiding device of the machine 100, which is arranged upstream of the second area 3.2 of the forming tube 3 in the forward movement direction A, receives the continuous re-closable strip 2.0, and is configured for redirecting said re-closable strip 2.0 in the forward movement direction A and housing it between said longitudinal ends L1 and L2, the longitudinal ends L1 and L2 being located one on each side of the re-closable strip 2.0 (when the longitudinal ends L1 and L2 are arranged facing one another around said second area 3.2, each of them is located on one side of the re-closable strip 2.0). The longitudinal sealing tool 4 is thus adapted for sealing said longitudinal ends L1 and L2 and the re-closable strip 2.0 to one another. The first driving assembly 7 of the machine 100 is thus also adapted for moving the film tube and the re-closable strip 2.0, simultaneously and jointly, in the forward movement direction A and at the second forward movement speed, once the re-closable strip 2.0 and the longitudinal ends L1 and L2 are sealed to one another.

The machine 100 further comprises a second driving assembly 8 upstream of the longitudinal sealing tool 4 in the path of the re-closable strip 2.0 (between the re-closable strip feeding device 2 and the longitudinal sealing tool 4), which is configured for moving the re-closable strip 2.0 at a specific third forward movement speed towards the longitudinal sealing tool 4. As a result of the cooperation between the second driving assembly 8, which causes the movement of the re-closable strip 2.0 as required, and the guiding device, which redirects said re-closable strip 2.0 as appropriate, the re-closable strip 2.0 is thereby arranged in the required position with respect to the longitudinal ends L1 and L2 and with the required tension, said tension preferably being constant in the segment of the re-closable strip 2.0 arranged between the first driving assembly 7 and the second driving assembly 8. In some embodiments, such as in a preferred embodiment, the second driving assembly 8 also functions as a guiding device, thus being arranged upstream of the second area 3.2 of the forming tube 3 (in the preferred embodiment it is arranged facing the first area 3.1 of said forming tube 3).

The first driving assembly 7, the second driving assembly 8, and the longitudinal sealing tool 4 are stationary in the forward movement direction A during normal operation of the machine 100.

The machine 100 also comprises actuation means, not depicted in the drawings, which are adapted for causing the actuation of the driving module 5 and of the two driving assemblies 7 and 8, and a control device configured for acting on the actuation means for said actuation means to cause the first forward movement speed, the second forward movement speed, and the third forward movement speed to be substantially the same.

Each of the driving assemblies 7 and 8 comprises two facing rollers 7.1 and 8.1. The first driving assembly 7 is arranged such that the already sealed longitudinal ends L1 and L2 of the film with a tubular shape move forward between both rollers 7.1 (together with the re-closable strip 2.0 also already sealed to said longitudinal ends L1 and L2), and said rollers 7.1 are configured for cooperating with one another to move said longitudinal ends L1 and L2 and said re-closable strip 2.0 in the forward movement direction A, in an operating position shown in FIGS. 4A and 4C. Particularly, in the operating position the rollers 7.1 firmly hold said longitudinal ends L1 and L2 between them, causing some to move when they rotate. Likewise, the second driving assembly 8 is arranged such that the re-closable strip 2.0 moves forward between its rollers 8.1, and said rollers 8.1 are configured for cooperating with one another to move said re-closable strip 2.0 in an operative position also shown in FIGS. 4A and 4C. Particularly, the rollers 8.1 firmly hold said re-closable strip 2.0 between them, being in said operative position, causing some to move when they rotate.

Figure 6A:
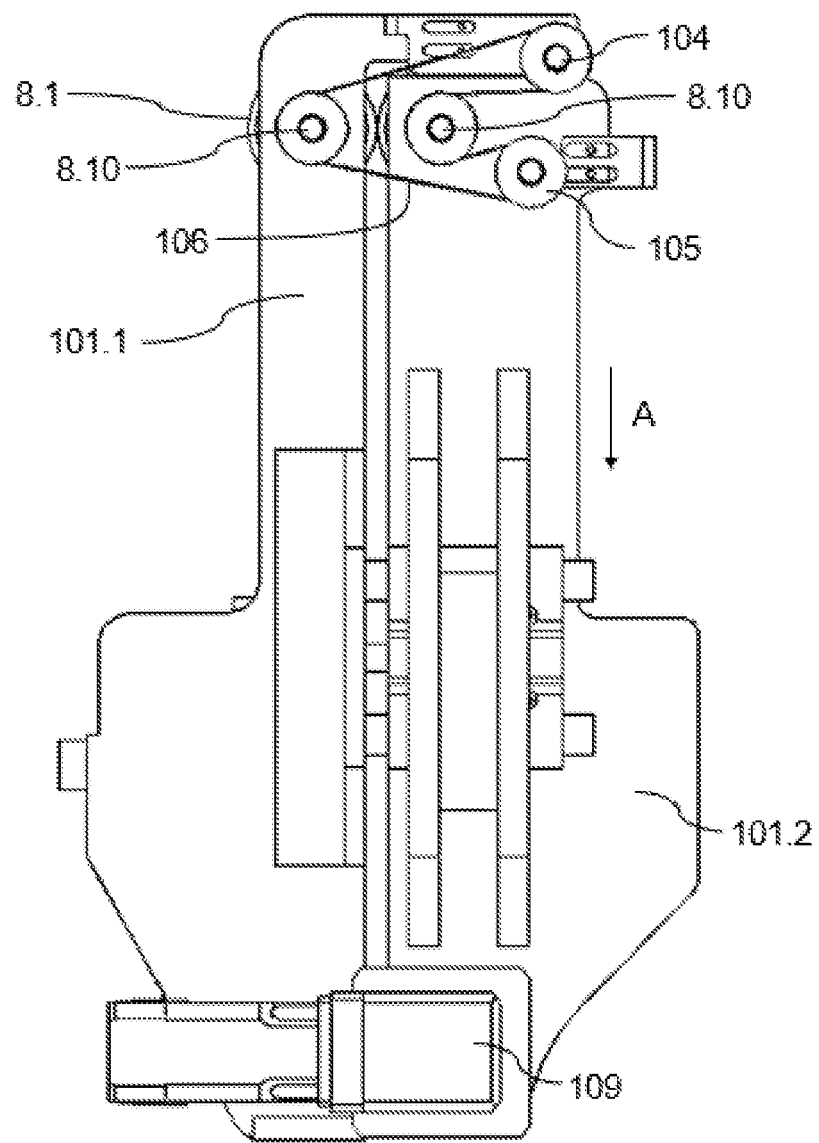
FIG. 6A is a rear view of the driving assemblies of FIG. 4A.
Figure 6B:
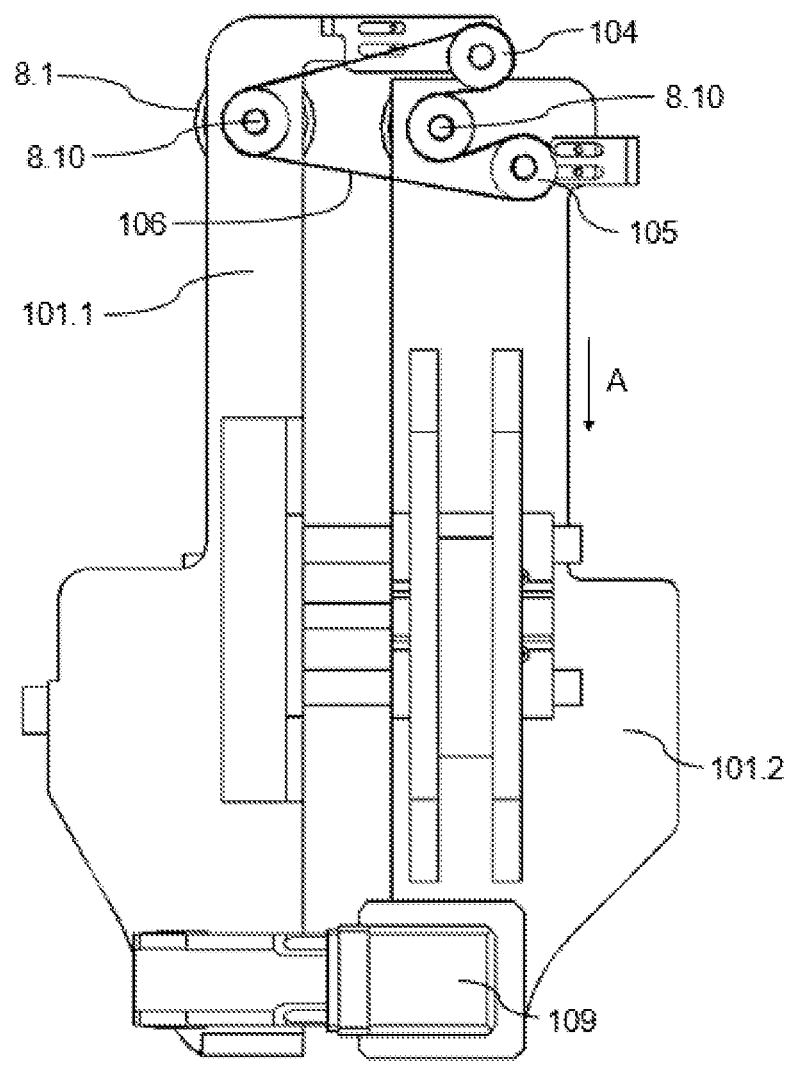
FIG. 6B is a rear view of the driving assemblies of FIG. 4B.

The driving assemblies 7 and 8 can also be arranged in a switching position shown in FIGS. 4B and 6B. This enables being able to arrange the re-closable strip 2.0 and the film L in place when film L and/or re-closable strip 2.0 need to be switched.

In the preferred embodiment, the driving assemblies 7 and 8 can be arranged in their operative position but without rotation, such that rollers 7.1 exert pressure against one another, keeping the longitudinal ends L1 and L2 secured and stationary, while at the same time rollers 8.1 exert pressure against one another, keeping the re-closable strip 2.0 secured and stationary, while sealing elements 4.1 are in the inoperative position (see FIG. 4A). With the driving assemblies 7 and 8 and the sealing tools 4.1 in these positions, neither the film tube nor the re-closable strip 2.0 move in the forward movement direction A, with the driving assemblies 7 and 8 being configured for keeping both the re-closable strip 2.0 and the film tube in place. Since the first driving assembly 7, the second driving assembly 8, and the longitudinal sealing tool 4 are stationary in the forward movement direction A, more precise positioning of the re-closable strip with respect to the forming tube 3 in said forward movement direction A is obtained, and the first forward movement speed, the second forward movement speed, and the third forward movement speed are more readily assured to be substantially the same.

In embodiments in which the sealing elements 4.1 are configured for sealing the longitudinal ends L1 and L2 by heat, pressing said longitudinal ends against one another, when the sealing elements 4.1 are in the sealing position pressing the longitudinal ends L1 and L2 of the film with a tubular shape, the control device is configured for keeping rollers 7.1 and 8.1 of the driving assemblies 7 and 8 still, without rotation, in a position in which rollers 7.1 exert pressure against one another, keeping the longitudinal ends L1 and L2 secured and stationary, while at the same time rollers 8.1 exert pressure against one another, keeping the re-closable strip 2.0 secured and stationary. In contrast, when the sealing elements 4.1 are in the inoperative position, located apart from one another to allow the forward movement of the longitudinal ends L1 and L2 through them in the forward movement direction A, the control device is configured for causing the rotation of rollers 7.1 and 8.1, such that rollers 7.1 move the longitudinal ends L1 and L2 in the forward movement direction A and rollers 8.1 move the re-closable strip 2.0 in the forward movement direction A. In these embodiments, the first driving assembly 7, the second driving assembly 8, and the longitudinal sealing tool 4 also remain stationary in the forward movement direction A.

In some embodiments, each roller 8.1 comprises a non-slip outer surface, preferably a gummed surface, preventing to a greater extent the slippage of the re-closable strip 2.0 upon contact with said rollers 8.1, and each roller 7.1 also comprises a non-slip surface, preferably a gummed surface, preventing to a greater extent the slippage of the longitudinal ends L1 and L2 of the film tube upon contact with said rollers 7.1. In some embodiments, the outer surfaces of rollers 8.1 comprise a recess (preferably in the form of a groove) adapted for housing the re-closable strip 2.0, and rollers 7.1 also comprise a recess adapted for housing the part of the longitudinal ends L1 and L2 which they contact. In some embodiments, such as in the preferred embodiment, rollers 7.1 and 8.1 comprise the described recess and a non-slip outer surface. Any other combination between non-slip surfaces and recesses would also be possible.

Each roller 8.1 of the second driving assembly 8 comprises a rotation shaft 8.10, and in some embodiments, the rotation shafts 8.10 of both rollers 8.1 are connected to one another. In the same manner, each roller 7.1 of the first driving assembly 7 comprises a rotation shaft 7.10, and in some embodiments, the rotation shafts 7.10 of said rollers 7.1 are connected to one another. In some embodiments, such as in the preferred embodiment, all the rotation shafts 7.10 and 8.10 are connected to one another.

The actuation means can comprise one actuation device for each rotation shaft 7.10 and 8.10 or for each pair of rotation shafts 7.10 and 8.10, depending on the embodiment, but in embodiments in which all the rotation shafts 7.10 and 8.10 are attached, the actuation means comprise one actuation device 109 associated with at least one of said rotation shafts 7.10 and 8.10 for causing the simultaneous and joint rotation of all the rollers 7.1 and 8.1.

In embodiments in which the second driving assembly 8 is arranged facing the first area 3.1 of the forming tube 3, such as that shown in FIG. 1 for example, the most downstream contact point in the forward movement direction A of the rollers 8.1 of the second driving assembly 8 with the re-closable strip 2.0 is aligned in said forward movement direction A with the most upstream contact point in said forward movement direction A of the rollers 7.1 of the first driving assembly 7 with the longitudinal ends L1 and L2 of the film with a tubular shape. In these embodiments, the second driving assembly 8 corresponds with the guiding device arranged upstream of the second area 3.2 of the forming tube 3, facing the first area 3.1 of said forming tube 3.

In the preferred embodiment, each roller 8.1 of the second driving assembly 8 is located on a respective different side of the re-closable strip 2.0, and each roller 7.1 of the first driving assembly 7 is located on a respective different side of said re-closable strip 2.0. The rollers 7.1 and 8.1 of both driving assemblies 7 and 8 arranged on the same side with respect to the re-closable strip 2.0 are attached to a respective platform 101.1 and 101.2 of the machine 100 with rotational freedom, and at least one of the platforms 101.1 and 101.2 is movable with respect to the other platform 101.1 and 101.2 in a transverse direction with respect to the forward movement direction A. This movement allows arranging the driving assemblies 7 and 8 in the operating position (FIGS. 4C and 6A) and in the switching position (FIGS. 4B and 6B), where both the re-closable strip 2.0 and the film L may be arranged suitably with respect to the forming tube 3 in a set-up of the machine 100, for example, with said driving assemblies 7 and 8 in the switching position. In the event that the longitudinal sealing tool 4 comprises two sealing elements 4.1, each of said sealing elements 4.1 is attached with freedom of transverse movement with respect to a respective platform 101.1 and 101.2, and the machine 100 comprises at least one actuation device configured for causing a transverse movement of both sealing elements 4.1 with respect to their respective platforms 101.1 and 101.2. Preferably, the actuation device associated with the sealing elements 4.1 is configured for causing a simultaneous transverse movement in opposite directions of both sealing elements 4.1 with respect to their respective platforms 101.1 and 101.2.

In some embodiments, such as in the preferred embodiment, the rollers 8.1 of the second driving assembly 8 are connected to one another by means of a transmission element 106, as shown in FIGS. 6A and 6B, and the machine 100 comprises at least one guiding roller 104 and 105 attached to each platform 101.1 and 101.2. Said guiding rollers 104 and 105 are configured for guiding the transmission element 106, each of said rollers 8.1 of the second driving assembly 8 being arranged between the two guiding rollers 104 and 105 in the path of the transmission element 106, and said transmission element 106 defining a closed path between said guiding rollers 104 and 105 and said rollers 8.1 of the second driving assembly 8. Therefore, when one platform 101.1 moves with respect to the other platform 101.2, the transmission element 106 maintains its tension. The transmission element 106 can be a belt, for example.

In some embodiments, such as in the preferred embodiment, the machine 100 can further comprise a perforation tool 10 configured for receiving the continuous re-closable strip 2.0 coming from the re-closable strip feeding device 2.0 and for generating a hole 10.1 in said re-closable strip 2.0 (as shown in FIG. 5, for example). The perforation tool 10 is arranged upstream of the second driving assembly 8 in the path of the re-closable strip 2.0. Therefore, when the re-closable strip 2.0 is sealed to the longitudinal ends L1 and L2 of the film with a tubular shape, said re-closable strip 2.0 already comprises the corresponding holes 10.1.

The actuation means of the machine 100 are furthermore adapted for causing the actuation of the perforation tool 10 and of the transverse sealing and cutting tool 6 such that said transverse sealing and cutting tool 6 acts on an area of the film tube comprising at least one hole 10.1 of the re-closable strip 2.0, when it performs transverse sealing and cutting. The risk of the transverse sealing and cutting tool 6 not performing suitable transverse sealing, which would affect the quality of the generated package P, due to the fact that, because of the nature thereof, the re-closable strip 2.0 is thicker and has different properties with respect to the film L (longitudinal ends L1 and L2), is thus prevented. Particularly, as a result of the hole 10.1, this correct transverse sealing, and, therefore, the tightness of the package P, are assured, packages P being re-closable packages and tight packages being able to be obtained.

Preferably, the actuation means are configured for causing the perforation tool 10 to generate holes 10.1 in the re-closable strip 2.0 spaced apart from one another a specific distance (specific distance between the center of two contiguous holes 10.1), said distance being substantially equal to the length in the forward movement direction A of the package P to be generated. The advantage described above is thereby assured, with a single hole 10.1 being made by the action of the transverse sealing and cutting tool 6 on the film tube.

The following clauses represent additional embodiments.

Clause 1: Packaging machine for generating re-closable packages, comprising a forming tube (3) configured for receiving a continuous film (L) and for imparting a tubular shape to said film (L) and comprising a first area (3.1) and a second area (3.2), the first area (3.1) being configured for receiving the continuous film (L) and for imparting a tubular shape to said film (L) such that said film (L) surrounds the second area (3.2) and longitudinal ends (L1, L2) of said film (L) are located facing one another around said second area (3.2), a longitudinal sealing tool (4) which is adapted for longitudinally sealing to one another the longitudinal ends (L1, L2) of the film with a tubular shape, a film tube being generated, a driving module (5) which is arranged facing the second area (3.2) of the forming tube (3) and adapted for moving the film tube, and/or the film with a tubular shape, in a forward movement direction (A) at a specific first forward movement speed, a first driving assembly (7) which is arranged facing the forming tube (3) and arranged downstream of the longitudinal sealing tool (4) in the forward movement direction (A) and configured for moving the film tube in the forward movement direction (A) at a specific second forward movement speed, acting on the longitudinal ends (L1, L2) of the film (L) previously sealed to one another, and a transverse sealing and cutting tool (6) which is arranged downstream of the forming tube (3) in the forward movement direction (A) and adapted for transversely sealing and cutting the film tube, a package (P) being obtained as a result, the machine (100) further comprises a guiding device which is arranged upstream of the second area (3.2) of the forming tube (3) in the forward movement direction (A) and configured for receiving a continuous re-closable strip (2.0) and redirecting it in said forward movement direction (A), such that the re-closable strip (2.0) is housed between the facing longitudinal ends (L1, L2) of the film with a tubular shape around the second area (3.2) of the forming tube (3), the longitudinal ends (L1, L2) being located one on each side of the re-closable strip (2.0), the longitudinal sealing tool (4) thus being adapted for sealing said longitudinal ends (L1, L2) and the re-closable strip (2.0) to one another, and the first driving assembly (7) thus being adapted for moving the film tube and the re-closable strip (2.0) in the forward movement direction (A), a second driving assembly (8) upstream of the longitudinal sealing tool (4) in the path of the re-closable strip (2.0), which is configured for moving the re-closable strip (2.0) at a specific third forward movement speed towards the longitudinal sealing tool (4), actuation means adapted for causing the actuation of the driving module (5) and of the two driving assemblies (7, 8), and a control device configured for acting on the actuation means for said actuation means to cause the first forward movement speed, the second forward movement speed, and the third forward movement speed to be substantially the same.

Clause 2: Packaging machine according to claim 1, wherein each of the driving assemblies (7, 8) comprises two facing rollers (7.1, 8.1), the first driving assembly (7) being arranged such that the longitudinal ends (L1, L2) of the film with a tubular shape and the re-closable strip (2.0) move forward between both rollers (7.1) of the first driving assembly (7) and said rollers (7.1) being configured for cooperating with one another to move said longitudinal ends (L1, L2) and said re-closable strip (2.0) in the forward movement direction (A), and the second driving assembly (8) being arranged such that the re-closable strip (2.0) moves forward between both rollers (8.1) of said second driving assembly (8), said rollers (8.1) being configured for cooperating with one another to move said re-closable strip (2.0).

Clause 3: Packaging machine according to claim 2, wherein each roller (8.1) of the second driving assembly (8) comprises a rotation shaft (8.10) and the rotation shafts (8.10) of said rollers (8.1) are connected to one another, and wherein each roller (7.1) of the first driving assembly (7) comprises a rotation shaft (7.10) and the rotation shafts (7.10) of said rollers (7.1) are connected to one another, the actuation means comprising a first actuation device associated with one of the rotation shafts (7.10) of the rollers (7.1) of the first driving assembly (7) for causing the rotation of said rollers (7.1) and a second actuation device associated with one of the rotation shafts (8.10) of the rollers (8.1) of the second driving assembly (8) for causing the rotation of said rollers (8.1).

Clause 4: Packaging machine according to claim 2, wherein each roller (8.1) of the second driving assembly (8) comprises a respective rotation shaft (8.10) and wherein each roller (7.1) of the first driving assembly (7) comprises a respective rotation shaft (7.10), all the rotation shafts (7.10, 8.10) being connected to one another and the actuation means comprising an actuation device (109) associated with at least one of said rotation shafts (7.10, 8.10) for causing the simultaneous and joint rotation of all the rollers (7.1, 8.1).

Clause 5: Packaging machine according to any of claims 1 to 4, wherein the second driving assembly (8) is arranged facing the first area (3.1) of the forming tube (3).

Clause 6: Packaging machine according to claim 5, wherein the most downstream contact point in the forward movement direction (A) of the rollers (8.1) of the second driving assembly (8) with the re-closable strip (2.0) is aligned in said forward movement direction (A) with the most upstream contact point in said forward movement direction (A) of the rollers (7.1) of the first driving assembly (7) with the longitudinal ends (L1, L2) of the film with a tubular shape.

Clause 7: Packaging machine according to claim 5 or 6, wherein each roller (8.1) of the second driving assembly (8) is located on a respective different side of the re-closable strip (2.0) and wherein each roller (7.1) of the first driving assembly (7) is located on a respective different side of said re-closable strip (2.0), with the rollers (7.1, 8.1) of both driving assemblies (7, 8) being arranged on the same side with respect to the re-closable strip (2.0) attached to a respective platform (101.1, 101.2) of the machine (100) with rotational freedom, at least one of the platforms (101.1, 101.2) being movable with respect to the other platform (101.1, 101.2) in a transverse direction with respect to the forward movement direction (A).

Clause 8: Packaging machine according to claim 7, wherein the rollers (8.1) of the second driving assembly (8) are connected to one another by means of a transmission element (106), the machine (100) comprising at least one guiding roller (104, 105) attached to each platform (101.1, 101.2) and said guiding rollers (104, 105) being configured for guiding the transmission element (106), each of said rollers (8.1) of the second driving assembly (8) being arranged between the two guiding rollers (104, 105) in the path of the transmission element (106) and said transmission element (106) defining a closed path between said guiding rollers (104, 105) and said rollers (8.1) of the second driving assembly (8).

Clause 9: Packaging machine according to claim 7 or 8, wherein the longitudinal sealing tool (4) comprises two facing sealing elements (4.1), each sealing element (4.1) being attached with freedom of movement to a respective platform (101.1, 101.2), and the machine (100) comprising at least one actuation device associated with the sealing elements (4.1) and configured for causing a transverse movement of both sealing elements (4.1) with respect to their respective platform (101.1, 101.2).

Clause 10: Packaging machine according to claim 9, wherein the actuation device associated with the sealing elements (4.1) is configured for causing a simultaneous transverse movement in opposite directions of both sealing elements (4.1) with respect to their respective platform (101.1, 101.2).

Clause 11: Machine according to any of claims 5 to 10, wherein the guiding device is the second driving assembly (8).

Clause 12: Packaging machine according to any of claims 1 to 11, comprising a perforation tool (10) configured for receiving the re-closable strip (2.0) and for generating a hole (10.1) in said re-closable strip (2.0), said perforation tool (10) being arranged upstream of the second driving assembly (8) in the path of the re-closable strip (2.0).

Clause 13: Packaging machine according to claim 12, wherein the actuation means are adapted for causing the actuation of the perforation tool (10) and of the transverse sealing and cutting tool (6) such that said transverse sealing and cutting tool (6) acts on at least one hole (10.1) of the re-closable strip (2.0) when performing transverse sealing and cutting.

Clause P14: Packaging machine according to claim 13, wherein the actuation means are adapted for causing the perforation tool (10) to generate holes (10.1) in the re-closable strip (2.0) spaced apart from one another a specific distance, said distance being substantially equal to the length in the forward movement direction (A) of the package (P) to be generated.

What is claimed is:
1. A packaging machine for generating a re-closable package, the packaging machine comprising:
a forming tube configured to receive a film having first and second longitudinal ends and to impart a tubular shape to the film, the forming tube including a first area and a second area, the first area being configured to receive the film and to impart the tubular shape to the film such that the film surrounds the second area and the first and second longitudinal ends of the film are located facing one another;

a guiding device arranged upstream of the second area of the forming tube in the forward movement direction and configured to receive a re-closable strip only and redirecting the re-closable strip in the forward movement direction such that the re-closable strip is housed between the facing first and second longitudinal ends of the film;

a longitudinal sealing tool configured to seal the first and second longitudinal ends of the film and the re-closable strip to one another such that a film tube is produced;

a driving module arranged facing the second area of the forming tube and configured to move the film tube, and/or the film with a tubular shape, in a forward movement direction at a first forward movement speed;

a first driving assembly arranged facing the forming tube and arranged downstream the longitudinal sealing tool in the forward movement direction, the first driving assembly configured to move the film tube in the forward movement direction at a second forward movement speed while acting on the first and second longitudinal ends of the film previously sealed to the re-closable strip;

a second driving assembly located upstream of the longitudinal sealing tool in the forward movement direction in a path of the re-closable strip, the second driving assembly configured to move the re-closable strip only and at a third forward movement speed towards the longitudinal sealing tool; and a transverse sealing and cutting tool arranged downstream of the forming tube in the forward movement direction and configured to transversely seal and cut the film tube such that the re-closable package is produced, wherein the first driving assembly comprises first and second rollers that face one other and the second driving assembly comprises first and second rollers that face one other, the first and second rollers of the first driving assembly being configured to rotate while respectively acting on the first and second longitudinal ends of the film to move the first and second ends of the film and the re-closable strip in the forward movement direction, the first and second rollers of the second driving assembly being configured to rotate while acting on opposite sides of the re-closable strip to move the re-closable strip in the forward movement direction, wherein the first and second rollers of the second driving assembly respectively include a first rotation shaft and a second rotation shaft, the first and second rotation shafts being rotationally connected to one another such that when one rotates so does the other, the first and second rollers of the first driving assembly respectively include a first rotation shaft and a second rotation shaft, the first and second rotation shafts of the first drive assembly being rotationally connected to one another such that when one rotates so does the other.

2. The packaging machine according to claim 1, further comprising actuation means configured to cause an actuation of the driving module and of the first and second driving assemblies, the packaging machine further comprising a control device configured to control the actuation means to cause the first forward movement speed, the second forward movement speed, and the third forward movement speed to be substantially the same.

3. The packaging machine according to claim 1, further comprising first and second actuation devices, the first actuation device coupled to one of the first and second rotation shafts of the first driving assembly for causing the one of the first and second rotation shafts of the first driving assembly to rotate, the second actuation device coupled to one of the first and second rotation shafts of the second driving assembly for causing the one of the first and second rotation shafts of the second driving assembly to rotate.

4. The packaging machine according to claim 1, wherein the first and second rollers of the second driving assembly respectively include a first rotation shaft and a second rotation shaft, the first and second rollers of the first driving assembly respectively include a first rotation shaft and a second rotation shaft, the first and second rotation shafts of the first driving assembly and the first and second rotation shafts of the second driving assembly all being rotationally coupled to one another such that when one rotates there is a simultaneous and joint rotation of all of the first and second rollers of the first and second driving assemblies.

5. The packaging machine according to claim 4, further comprising an actuation device coupled to one of the first and second rotation shafts of the first driving assembly and the second driving assembly for causing the one of the first and second rotation shafts of the first and second driving assemblies to rotate.

6. The packaging machine according to claim 1, wherein the second driving assembly is arranged facing the first area of the forming tube.

7. The packaging machine according to claim 6, wherein the second driving assembly comprises first and second rollers that face one other, the first and second rollers of the second driving assembly being configured to rotate while acting on opposite sides of the re-closable strip to move the re-closable strip in the forward movement direction, the first driving assembly comprises first and second rollers that face one other, the first and second rollers of the first driving assembly being configured to rotate while respectively acting on the first and second longitudinal ends of the film to move the first and second ends of the film and the re-closable strip in the forward movement direction, a most downstream contact point of the re-closable strip in the forward movement direction of the first and second rollers of the second driving assembly being aligned in the forward movement direction with a most upstream contact point of the first and second longitudinal ends of the film in the forward movement direction of the first and second rollers of the first driving assembly.

8. The packaging machine according to claim 1, further comprising first and second platforms, at least one of the first and second platforms being moveable in a transverse direction with respect to the forward movement direction, the first rollers of each of the first and second drive assemblies being attached to the first platform and the second rollers of the first and second drive assemblies being attached to the second platform.

9. The packaging machine according to claim 8, wherein the first and second rollers of the second driving assembly are connected to one another by means of a transmission element, the packaging machine further comprising first and second guiding rollers that are respectively attached to the first and second platform, the first and second guiding rollers being configured to guide the transmission element, each of the first and second rollers of the second driving assembly being arranged between the first and second guiding rollers in the path of the transmission element, the transmission element defining a closed path between the first and second guiding rollers and the first and second rollers of the second driving assembly.

10. The packaging machine according to claim 8, wherein the longitudinal sealing tool comprises first and second sealing elements that face one another, the first sealing element being attached with freedom of movement to the first platform, the second sealing element being attached with freedom of movement to the second platform, the packaging machine further comprising at least one actuation device associated with the first and second sealing elements and configured to cause a transverse movement of the first sealing elements with respect to the first platform and a transverse movement of the second element with respect to the second platform.

11. The packaging machine according to claim 10, wherein the actuation device associated with the first and second sealing elements is configured to cause the first and second sealing elements to simultaneous move in opposite directions.

12. The packaging machine according to claim 1, wherein the guiding device is comprised in the second driving assembly.

13. The packaging machine according to claim 1, further comprising a perforation tool configured to receive the re-closable strip and to generate a hole in the re-closable strip, the perforation tool being arranged upstream of the second driving assembly in a path of the re-closable strip.

14. The packaging machine according to claim 13, further comprising actuation means to cause the transverse sealing and cutting tool to cut across the hole of the re-closable strip when performing transverse sealing and cutting.

15. The packaging machine according to claim 1, further comprising a perforation tool configured to receive the re-closable strip and to generate first and second spaced-apart holes in the re-closable strip, the perforation tool being arranged upstream of the second driving assembly in a path of the re-closable strip, the packing machine further comprising actuation means to cause the transverse sealing and cutting tool to cut across the first and second spaced-apart holes of the re-closable strip when performing transverse sealing and cutting.

16. The packaging machine according to claim 1, wherein the second driving assembly is configured to cause a movement of only the re-closable strip.

17. The packaging machine according to claim 1, further comprising actuation means operationally coupled to at least one of the first and second rollers of the second driving assembly and operationally coupled to at least one of the first and second rollers of the first driving means, the actuation means configured to cause the at least one of the first and second rollers of the second driving assembly and the at least one of the first and second rollers of the first drive assembly to remain stationary when the longitudinal sealing tool acts to seal the first and second longitudinal ends of the film and the re-closable strip to one another.

18. The packaging machine according to claim 1, wherein the first and second rollers of the first driving assembly respectively include first and second grooves for respectively receiving the first and second longitudinal ends of the film.

\* \* \* \* \*